(12) United States Patent
Kweon et al.

(10) Patent No.: US 8,704,395 B2
(45) Date of Patent: Apr. 22, 2014

(54) WAVE ACTIVATED POWER GENERATOR

(75) Inventors: Hyuck-Min Kweon, Daegu (KR);
Oh-Kyun Kwon, Daegu (KR);
Jung-Lyul Lee, Hwaseong-si (KR);
Sang-Shin Park, Daegu (KR);
Il-Hyoung Cho, Jeju-si (KR)

(73) Assignee: Body for Gyeongju Univ. Education & Industry Cooperation, Gyeongju-Si, Gyeongsangbuk-Do (KR)

( * ) Notice: Subject to any disclaimer, the term of this patent is extended or adjusted under 35 U.S.C. 154(b) by 324 days.

(21) Appl. No.: 13/279,659

(22) Filed: Oct. 24, 2011

(65) Prior Publication Data

US 2013/0015664 A1 Jan. 17, 2013

(30) Foreign Application Priority Data

Jul. 12, 2011 (KR) .................. 10-2011-0069031

(51) Int. Cl.
*F03B 13/10* (2006.01)
*F03B 13/12* (2006.01)
*H02P 9/04* (2006.01)

(52) U.S. Cl.
USPC ........................................ 290/53

(58) Field of Classification Search
USPC .......................................... 290/53, 43, 54, 42
See application file for complete search history.

(56) References Cited

U.S. PATENT DOCUMENTS

2007/0273156 A1* 11/2007 Miyajima et al. ............... 290/53

FOREIGN PATENT DOCUMENTS

WO 2005/040603 A1 5/2005

\* cited by examiner

*Primary Examiner* — Javaid Nasri
(74) *Attorney, Agent, or Firm* — Kile Park Reed & Houtteman PLLC

(57) ABSTRACT

The present invention relates to an improved wave activated power generator. The power generator includes a pile, a chain secured at opposite ends thereof to the pile and a floating body, respectively, a suction pipe communicating at one end thereof with an interior of the pile and secured at the other end thereof to the floating body to be exposed from a sea surface, and an air supply pipe connected at one end thereof to an upper end of the tube to communicate with a tube and secured at the other end thereof to the floating body to be exposed from the sea surface. The chain is sealed and surrounded with the tube filled with air. The suction pipe is disposed to pass through the tube.

3 Claims, 4 Drawing Sheets

WAVE ACTIVATED POWER GENERATOR

CROSS-REFERENCE TO RELATED APPLICATION

This application claims the benefit under 35 U.S.A. §119 of Korean Patent Application No. 10-2011-0069031, filed on Jul. 12, 2011 in the Korean Intellectual Property Office, the entirety of which is incorporated herein by reference.

BACKGROUND

1. Technical Field

Exemplary embodiments of the present invention relate to a wave activated power generator and more particularly to a wave activated power generator which highly efficiently converts wave energy into electric energy.

2. Description of the Related Art

There are two ways of generating power using wave energy. In a first method, a wave power generator is constituted by interposing a permanent magnet and a coil between two floating bodies which move relative to each other. In a second method, a wave power generator includes a mass inserted into a single floating body with a permanent magnet and a coil interposed between the mass and the floating body which move relative to each other.

The first method requires two floating bodies that move relative to each other, one of which is secured to the sea bed, and the other of which floats on the surface of waves, and allows the two floating bodies to move relative to each other in a watertight state. Thus, this method has a complicated structure and undergoes difficulty in maintenance and repair.

The second method requires only one floating body secured to the sea bed and provides a watertight structure to the floating body. Therefore, the second method has a simple structure and facilitates maintenance and repair as compared with the first method, and thus is more applicable to a waver power generator than the first method.

According to the second method, in order to increase a vertical shifting amount (amplitude) of the mass, the mass is supported by an elastic member in the floating body and an un-damped natural frequency of the elastic member is matched with the frequency of waves, which increasingly vibrate the mass, to generate resonance between the elastic member and the waves, thereby maximizing the vertical shifting amount of the mass and increasing power generating efficiency. One example using the second method is disclosed in A plurality of such wave power generators generating resonance is disposed in the coastal area and secured to the sea bed through an anchor and wires to prevent the wave power generators from drifting in a direction of waves.

However, the weight of a chain secured at one end thereof to the anchor and at the other end to the floating body disturbs upward motions of the floating body caused by waves, thereby reducing the vertical shifting amount of the floating body.

Further, since the anchor is secured to a concrete structure placed in the sea bed, it is considerably slow and difficult for workers to move the resonance-type wave power generator to land or a ship for maintenance and repair thereof or to transfer for installation to a place with big waves from a place with tiny waves.

BRIEF SUMMARY

The present invention is directed to solving problems as mentioned above.

In accordance with an aspect of the present invention, a wave activated power generator includes: an anchor used as a pile; a chain secured at opposite ends thereof to the pile and a floating body, respectively, the chain being sealed and surrounded with a tube filled with air; a suction pipe communicating at one end thereof with an interior of the pile and secured at the other end thereof to the floating body to be exposed from a sea surface, the suction pipe being disposed to pass through the tube; and an air supply pipe connected at one end thereof to an upper end of the tube to communicate with the tube and secured at the other end thereof to the floating body to be exposed from the sea surface.

BRIEF DESCRIPTION OF THE DRAWINGS

The above and other aspects, features, and advantages of the invention will become apparent from the following detailed description of exemplary embodiments in conjunction with the accompanying drawings, in which.

DETAILED DESCRIPTION

Embodiments of the present invention will be described with reference to FIGS. 1 to 4.

Figure 1:
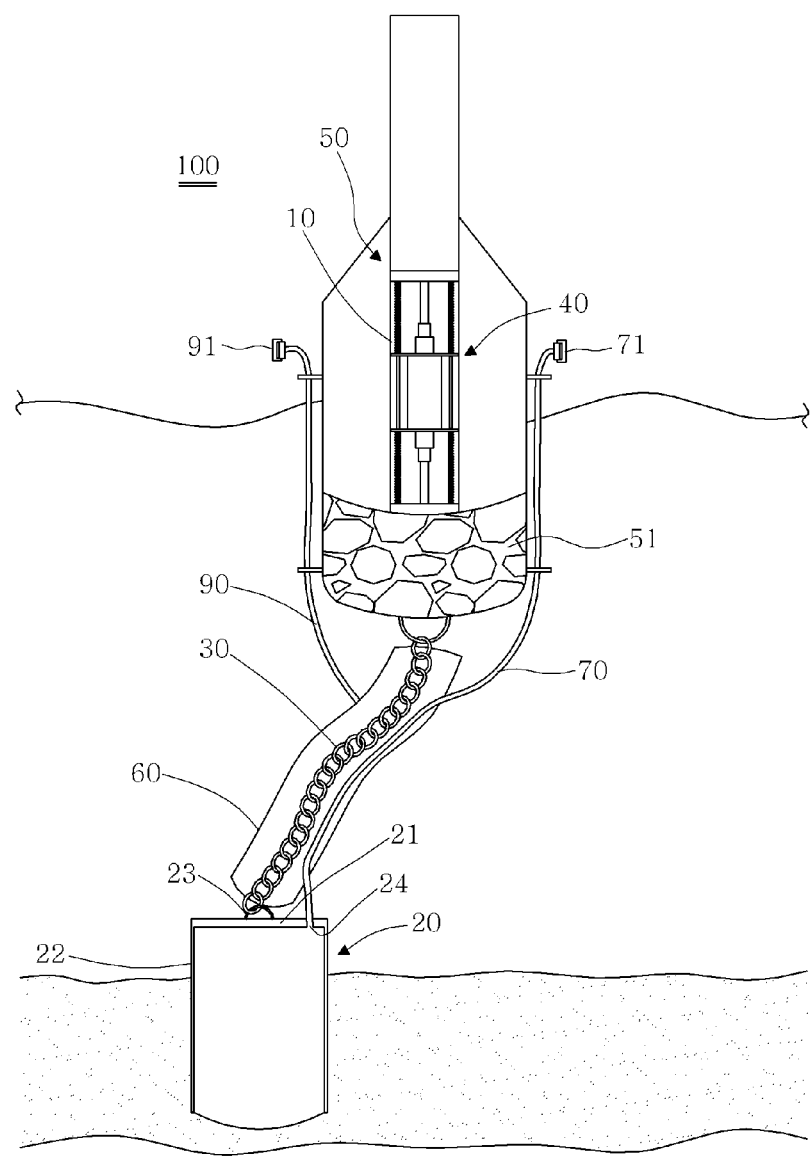
FIG. 1 is a front projection view of a wave activated power generator according to an embodiment of the present invention.

Referring to FIG. 1, a wave activated power generator 100 according to an embodiment includes a case 10, which sealingly accommodates a power generation unit 40 for generating power by generating induced electromotive force in a coil through relative movement of a permanent magnet and the coil, a floating body 50 enclosing a lower portion of the case 10 while exposing an upper portion of the case 10, a pile 20, and a chain 30 secured at opposite ends thereof to the floating body 50 and the pile 20, respectively.

The floating body 50 generally has a tumbler shape and includes a mass 51, which is inserted into a lower portion of the floating body 50 to have a center of gravity at a center of a bottom of the floating body 50.

Figure 2:
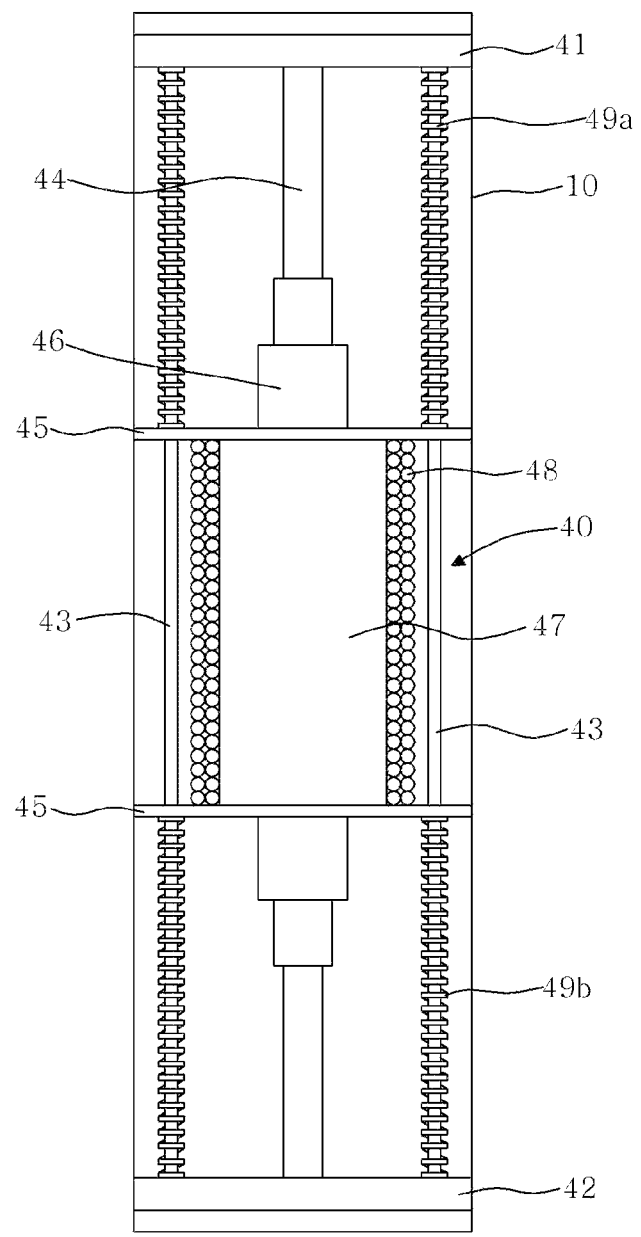
FIG. 2 is a front projection view of a power generation unit according to the present invention.

Referring to FIGS. 1 and 2, the power generation unit 40 includes an upper disk 41 securely inscribed in an upper end of the case 10, a lower disk 42 securely inscribed in a lower end of the case 42, a plurality of erect guide rails 43 secured at opposite ends thereof to rims of the upper and lower disks 41, 42 and disposed at the same phase difference with respect to a central axis of the upper and lower disks 41, 42, an erect fixing shaft 44 secured at opposite ends thereof to central regions of the upper and lower disks 41, 42, a pair of carrier circular plates 45 disposed at regular intervals towards the central axis of the upper and lower disks 41, 42 and movable up and down along the erect guide rails 43, an tubular permanent magnet 46 securely circumscribed on the erect fixing shaft 44 and movably inscribed in the pair of carrier circular plates 45, a tubular weight member 47 secured at upper and lower ends thereof to the pair of carrier circular plates 45 and movably circumscribed on the permanent magnet 46, a coil 48 securely circumscribed on the weight member 47, a plurality of upper elastic springs 49a each having an upper end in contact with the upper disk 41 and a lower end in contact with an upper carrier circular plate among the carrier circular plates 45, and a plurality of lower elastic springs 49b each having an upper end in contact with a lower carrier circular plate among the carrier circular plates 45 and a lower end in contact with the lower disk 42.

The upper and lower elastic springs 49a, 49b have an undamped natural frequency corresponding to an average frequency of waves at a coast where the waver activated power generator 100 is installed, and thus resonance occurs between the upper and lower elastic springs 49a, 49b and the weight member 47. Accordingly, an average vertical shifting amount of the weight member 47 is maximized, so that the wave activated power generator 100 may efficiently generate maximum capacity of power.

Figure 3:
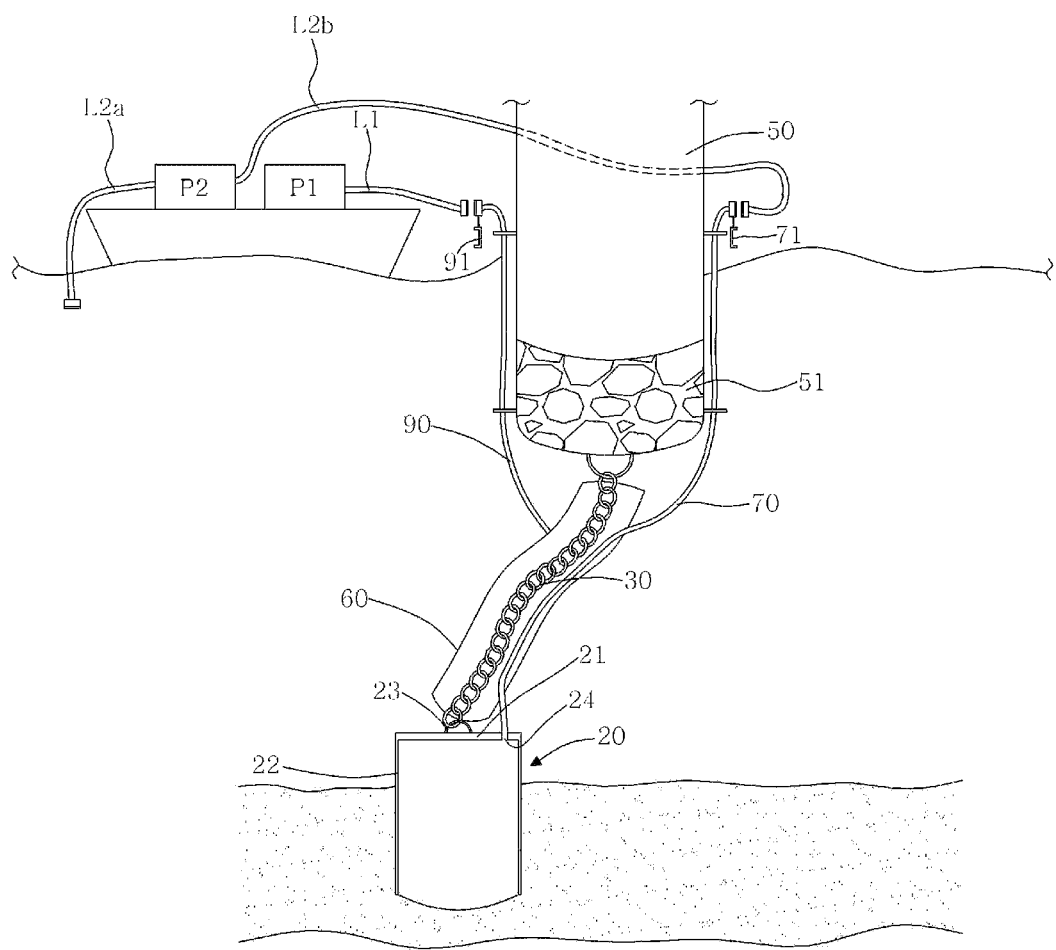
FIG. 3 illustrates installation of the wave activated power generator of FIG. 1.

Referring to FIGS. 1 and 3, the pile 20 includes a tubular portion 22 having an open bottom and a closed ceiling 21, a link 23 disposed at the center of the ceiling 21 to be coupled to a lower end of the chain 30, and a through-hole 24 formed in the ceiling 21.

The chain 30 is inserted into a flexible tube 60 and extends in a longitudinal direction of the tube 60, with the opposite ends of the chain 30 exposed from the tube 60.

The tube 60 is sealingly coupled at opposite ends thereof to the chain 30 which penetrates the tube 60.

A flexible suction pipe 70 extends within the tube 60 in the longitudinal direction of the tube 60.

Further, the suction pipe 70 is connected at a lower end thereof to the through-hole 24 of the pile 20 through a lower end of the tube 60 to communicate with the pile 20 and is secured at an upper end thereof to a side wall of the floating body 50 through an upper end of the tube 60.

Portions of the tube 60, through which the upper and lower ends of the suction pipe 70 pass, are sealingly coupled to the suction pipe 70.

Further, the upper end of the tube 60 is connected to a lower end of an air supply pipe 90 such that the tube 60 communicates with the air supply pipe 90 therethrough, and the air supply pipe 90 is connected at an upper end thereof to the lateral wall of the floating body 50.

The air supply pipe 90 and the suction pipe 70 are detachably coupled at the upper ends thereof to caps 91, 71 to be sealed by the caps 91, 71, respectively.

The wave activated power generator having such configuration may be installed in a coastal area as follows.

First, referring to FIG. 3, an air supply source P1 and a suction pump P2 are prepared on a deck.

The wave activated power generator 100 equipped with the tube 60, the air supply pipe 90 and the suction pipe 70 having empty interiors is placed on the deck. After being transported to a target coastal area, the wave activated power generator 100 is placed on the sea surface and the pile 20 is placed on the sea bed of the coastal area.

Then, the cap 71 is separated from the suction pipe 70 and the upper end of the suction pipe 70 is connected to an inlet of the suction pump P2 via a suction passage L2b. Then, the suction pump P2 is operated to suction water and soil on the sea bed into the pile 20 and to discharge the water and soil out of the pile 20, thereby setting the pile 20 in the sea bed. Here, due to difference between internal and external pressures of the pile, the pile 20 is stably secured to the sea bed.

Next, the upper end of the suction pipe 70 is detached from the suction pump P2 and the cap 71 is coupled to the upper end of the suction pipe 70.

Then, the cap 91 is separated from the air supply pipe 90 and the upper end of the air supply pipe 90 is connected to an outlet of the air supply source P1 via a discharge pipe L1. After operating the air supply source P1 to fill the tube 60 with air, the upper end of the air supply pipe 90 is detached from the air supply source P1 and the cap 91 is coupled to the upper end of the air supply pipe 90.

As a result, the wave activated power generator 100 may be easily installed in the coastal area, as shown in FIG. 1.

The floating body 50 of the wave activated power generator 100 installed in the coastal area is vibrated up and down due to wave oscillation of a wave surface. Here, since the mass 51 is inserted into the lower portion of the floating body 50 so that the center of gravity is placed at the center of the bottom of the floating body 50, the floating body 50 is vibrated up and down at a broader amplitude than the amplitude of the waves due to inertia of the mass 51, thereby stably maintaining an erect position. Here, since the heavy chain 30 is inserted into the tube 60 filled with air and disposed in the sea, the weight of the chain 30 is reduced due to buoyancy and vertical shifting of the floating body 50 is not disturbed by the weight of the chain 30.

In this state, since the upper and lower elastic springs 49a, 49b have an undamped natural frequency corresponding to an average frequency of waves on the coast where the water activated power generator 100 is installed, resonance occurs between the upper and lower elastic springs 49a, 49b and the weight member 47. Accordingly, an average vertical shifting amount of the weight member 47 is maximized, so that the wave activated power generator 100 may efficiently generate maximum power capacity.

Figure 4:
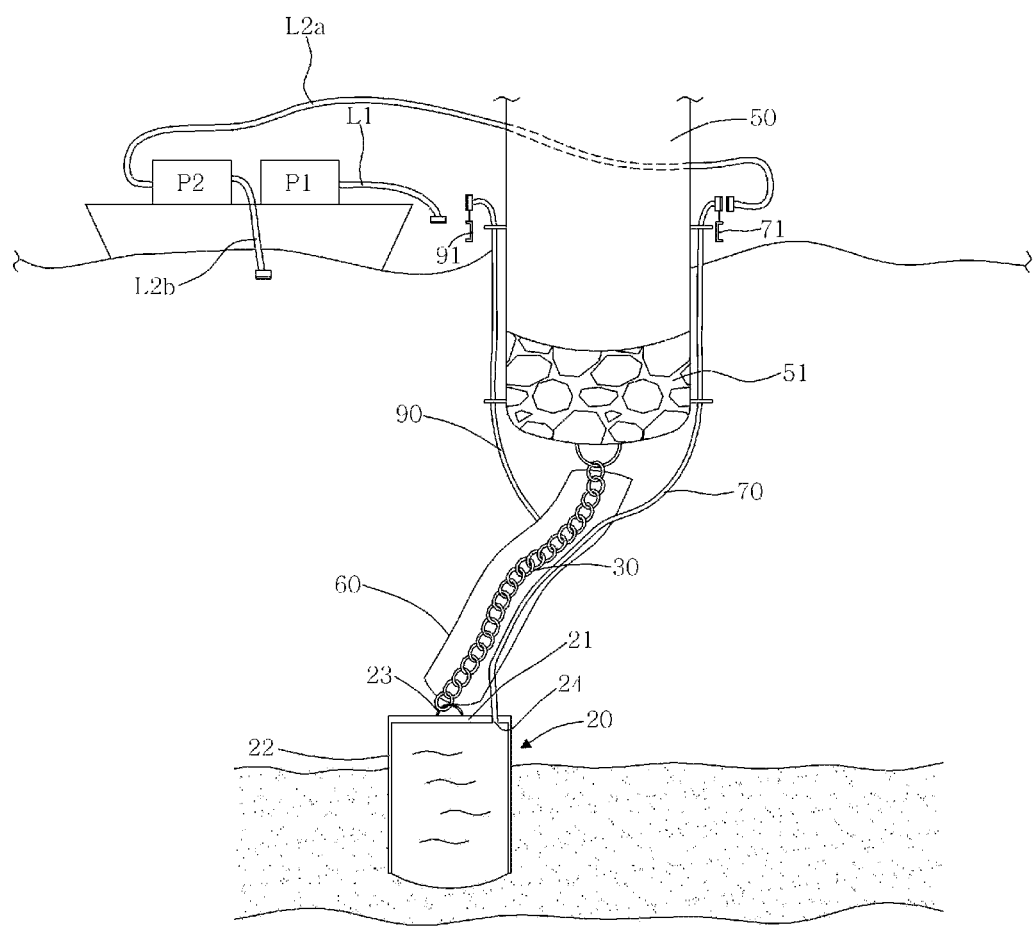
FIG. 4 illustrates transfer of the wave activated power generator of FIG. 1.

When the wave activated power generator 100 is transported for maintenance and repair, as shown in FIG. 4, the cap 71 is detached from the upper end of the suction pipe 70, the upper end of the suction pipe 70 is connected to the outlet of the suction pump P2 via a discharge passage L2a and the inlet of the suction pump P2 is connected to the surface of water via the suction passage L2b, so that water flows into the pile 20 via the suction pipe 70 and the through-hole 24. Accordingly, when internal and external pressures of the pile 20 become equal, the chain 30 rises upwards due to buoyancy of the tube 30, and the pile set in the sea bed due to the weight thereof escapes from the sea bed.

Here, if buoyancy of the tube 30 is less than force with which the pile 20 escapes from the sea bed, the cap 90 is detached from the upper end of the air supply pipe 90 to ventilate the tube 60 via the air supply pipe 90, and the tube 60 is then picked up using towing equipment (not shown), thereby allowing the pile 20 to be easily removed from the sea bed. The tube 60 is lifted above the water surface and placed on the hull, thereby readily moving the wave activated power generator 100.

As described above, according to the embodiment of the invention, since the weight of a chain is reduced, vertical shifting of a floating body caused by waves is not disturbed, thereby increasing the total vertical shifting of the floating body as compared with a resonance-type wave power generator. Further, the anchor may be easily installed to and disassembled from the sea bed as compared with a conventional method, thereby facilitating movement of the resonance-type wave power generator.

Although some embodiments have been described herein, it should be understood by those skilled in the art that these embodiments are given by way of illustration only, and that various modifications, variations, and alterations can be made without departing from the spirit and scope of the invention.

Therefore, the scope of the invention should be limited only by the accompanying claims and equivalents thereof.

What is claimed is:

1. A wave activated power generator comprising:
   a case 10 sealingly accommodating a power generation unit 40 which generates power by generating induced electromotive force in a coil 48 through relative movement of a permanent magnet 46 and the coil 48;
   a floating body 50 enclosing a lower portion of the case 10 while exposing an upper portion of the case 10;
   a pile 20 installed on a sea bed; and
   a chain 30 secured at opposite ends thereof to the floating body 50 and the pile 20, respectively,
   wherein the floating body 50 has a tumbler shape with a mass 51 inserted into a lower portion of the floating body 50 to have a center of gravity placed a center of a bottom of the floating body 50,
   the power generation unit 40 is provided with an elastic spring supporting a weight member 47 in the power generation unit 40 and having an undamped natural frequency corresponding to an average frequency of waves,
   the pile 20 comprises a tubular portion 22 having an open bottom and a closed ceiling 21, a link 23 disposed at a center of the ceiling 21 to be coupled to a lower end of the chain 30, and a through-hole 24 formed in the ceiling 21,
   the chain 30 is inserted into a flexible tube 60 and extends in a longitudinal direction of the tube 60, with the opposite ends of the chain 30 exposed from the tube 60,
   the tube 60 is provided therein with a flexible suction pipe 70 extending in the longitudinal direction of the tube 60, the flexible suction pipe 70 being connected at a lower end thereof to the through-hole 24 of the pile 20 through a lower end of the tube 60 to communicate with the pipe 20 and being secured at an upper end thereof to a side wall of the floating body 50 through an upper end of the tube 60, and
   the tube 60 is connected at the upper end thereof to a lower end of an air supply pipe 90 to communicate with the air supply pipe 90, an upper end of which is connected to the side wall of the floating body 50,
   the air supply pipe 90 and the suction pipe 70 being detachably coupled at the upper ends thereof to caps 91, 71 to be sealed by the caps 91, 71, respectively.

2. The wave activated power generator of claim 1, wherein the power generation unit 40 comprises an upper disk 41 securely inscribed in an upper end of the case 10, a lower disk 42 securely inscribed in a lower end of the case 10, a plurality of erect guide rails 43 secured at opposite ends thereof to rims of the upper and lower disks 41, 42 and disposed at an identical phase difference with respect to a central axis of the upper and lower disks 41, 42, an erect fixing shaft 44 secured at opposite ends thereof to central regions of the upper and lower disks 41, 42, a pair of carrier circular plates 45 disposed at regular intervals towards the central axis of the upper and lower disks 41, 42 and movable up and down along the erect guide rails 43, the tubular permanent magnet 46 securely circumscribed on the erect fixing shaft 44 and movably inscribed in the pair of carrier circular plates 45, the tubular weight member 47 secured at upper and lower ends thereof to the pair of carrier circular plates 45 and movably circumscribed on the permanent magnet 46, the coil 48 securely circumscribed on the weight member 47, the plurality of upper elastic springs 49a each having an upper end in contact with the upper disk 41 and a lower end in contact with an upper carrier circular plate among the carrier circular plates 45, and the plurality of lower elastic springs 49b each having an upper end in contact with a lower carrier circular plate among the carrier circular plates 45 and a lower end in contact with the lower disk 42.

3. The wave activated power generator of claim 1, wherein the tube 60 is sealingly coupled at opposite ends thereof to the chain 30 which penetrates the tube 60, and portions of the tube 60, through which the upper and lower ends of the suction pipe 70 pass, are sealingly coupled to the suction pipe 70.

* * * * *